United States Patent
Hillier et al.

(10) Patent No.: US 6,954,467 B1
(45) Date of Patent: Oct. 11, 2005

(54) CLUSTERED NETWORKED DEVICES

(75) Inventors: Paul V. Hillier, Horsham (GB); Peter J. Lanigan, Croydon (GB); Nicoll B. Shepherd, Coulsdon (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 670 days.

(21) Appl. No.: 09/656,130

(22) Filed: Sep. 6, 2000

(30) Foreign Application Priority Data

Sep. 7, 1999  (GB) ..................... 9921049

(51) Int. Cl.$^7$ .............................. H04J 3/16
(52) U.S. Cl. ................. 370/466; 370/401; 370/480
(58) Field of Search ................ 370/389, 400, 370/401, 402, 480, 489, 490, 465, 466, 467; 709/220, 223, 224

(56) References Cited

U.S. PATENT DOCUMENTS

| | | | |
|---|---|---|---|
| 5,754,548 A | 5/1998 | Hoekstra et al. | 370/402 |
| 6,085,236 A * | 7/2000 | Lea | 709/220 |
| 6,115,392 A * | 9/2000 | Nomura | 370/466 |
| 6,496,862 B1 * | 12/2002 | Akatsu et al. | 709/224 |
| 6,523,696 B1 * | 2/2003 | Saito et al. | 709/223 |

FOREIGN PATENT DOCUMENTS

| | | | | |
|---|---|---|---|---|
| EP | 0835037 A2 | 6/1997 | ......... | H04Q 11/04 |
| EP | 0837579 A2 | 10/1997 | ......... | H04L 12/28 |
| EP | 0835037 A2 * | 8/1998 | | |
| WO | WO 9935856 | 7/1999 | | |

OTHER PUBLICATIONS

EP 0 835 037 A (Tokyo Shiboura Electric Co) Apr. 8, 1998 Figure 41.
WO 99 35856 A (Sony Electronics Inc) Jul. 15, 1999 abstract p. 5, line 12—page 6, line 10 p. 7, line 10—line 25, p. 15, line 7—line 26, p. 19, line 1—p. 20, line 22, p. 21, line 22—p. 22, line 16, p. 23, line 9—p. 24, line 9.

* cited by examiner

Primary Examiner—Bob A. Phunkulh

(57) ABSTRACT

A local communication system comprises a first cluster (10) of devices interconnected for the communication of messages via a first data bus (18) and in accordance with a first set of communication protocols, a second cluster (20) interconnected via a second data bus (28) and following the first set of communication protocols; and a data channel (41) linking a device (19) of the first cluster (10) and a device (29) of the second cluster (20). The data channel (41) suitably comprises an RF link supporting communication of messages in accordance with a second set of communications protocols. A device (19) of the first cluster (10) holds a stored software representation of operational features of a selected device (DVHS-2) of the second cluster (20) and any device (11) of the first cluster wishing to interact with said selected device (DVHS-2; 22) instead interacts with said stored representation.

3 Claims, 3 Drawing Sheets

CLUSTERED NETWORKED DEVICES

BACKGROUND OF THE INVENTION

The present invention relates to networked systems composed of a plurality of devices clustered for the exchange of data and control messages formatted according to predetermined protocols and, in particular although not essentially, to such systems where inter-device communication between some of the devices is via wireless link. The invention further relates to devices for use in groups or clusters to form such systems.

Networked interconnection of devices has long been known and used, starting from basic systems where different system functions have been provided by separate units, for example hi-fi systems or security systems having detectors, a control panel and one or more alarm sounders. A development has been the so-called home bus systems where a greater variety of products have been linked with a view to providing enhanced overall functionality in for example domestic audio/video apparatus coupled with a home security system and the use of telephone. An example of such a home bus system is the domestic digital bus (D2B), the communications protocols for which have been issued as standard IEC 1030 by the International Electrotechnical Commission in Geneva, Switzerland. The D2B system provides a single wire control bus to which all devices are interfaced with messages carried between the various devices of the system in a standardised form of data packet.

With all such domestic equipment interconnection schemes, there is a problem of connection to apparatus not supporting the communications protocols of the scheme. As an example, a user may have a music system comprising interconnected units such as a compact disc (CD) player, amplifier, tuner and cassette player which communicate with each other using a first set of communications protocols, together with an audio visual system comprising for example a television, video recorder and satellite receiver which communicate using a second set of protocols. In the absence of a certain degree of compatibility with existing systems, a user may be faced with having to replace many items at one time. One way to reduce this problem is to provide a gateway device which supports two or more sets of communications protocols and can "translate" messages between them, as described in U.S. Pat. No. 5,754,548 (Hoekstra et al), where D2B is used as a subsystem within a home electronic bus (HEB) system.

As is also described in U.S. Pat. No. 5,754,548, such gateway devices can be used as part of a link between two clusters of bus-connected devices supporting the same communications protocols, but with different protocols governing communications on the link between the clusters. The link between the clusters may, for example, comprise a wireless (infra-red or RF) channel between the two gateway devices, whilst the cluster devices themselves are hard wired to respective serial data buses.

SUMMARY OF THE INVENTION

It is an object of the present invention to provide a networked system of devices including one or more communications links capable of handling digital data.

In accordance with a first aspect of the present invention there is provided a local communication system comprising:
a first cluster of devices interconnected for the communication of messages via a first data bus and in accordance with a first set of communication protocols;
a second cluster of devices interconnected for the communication of messages via a second data bus and in accordance with said first set of communication protocols; and
a data channel linking a device of said first cluster and a device of said second cluster, said data channel supporting communication of messages in accordance with a second set of communications protocols;
wherein a device of the first cluster holds a stored software representation of operational features of a selected device of the second cluster and any device of the first cluster wishing to interact with said selected device instead interacts with said stored representation. As will be described hereinafter, interaction with a locally held proxy avoids the need for rewriting of cluster communications protocols simply to accommodate different transport capabilities and/or conditions on the bridge.

The stored representation may be generated by the said selected device and transmitted via said data channel to said device of the first cluster, and the said stored representation may be modified in response to limitations of said data channel, in which case the modification may occur on receipt by said device of the first cluster, in response to limitations of said data channel.

The stored representation may model the said selected device as if it were a device of the first cluster, and the said device of the first cluster holding the stored representation may suitably be that device of the first cluster to which the data channel is connected. The said data channel may be a wireless link.

In accordance with a further aspect of the present invention, there is provided a communications device having the technical features of a cluster-connected device in a system as recited above.

BRIEF DESCRIPTION OF THE DRAWING

Further features and advantages of the present invention will become apparent from reading of the description of preferred embodiments of the invention, given by way of example only and with reference to the accompanying drawings, in which.

DESCRIPTION OF THE PREFERRED EMBODIMENTS

Figure 1:
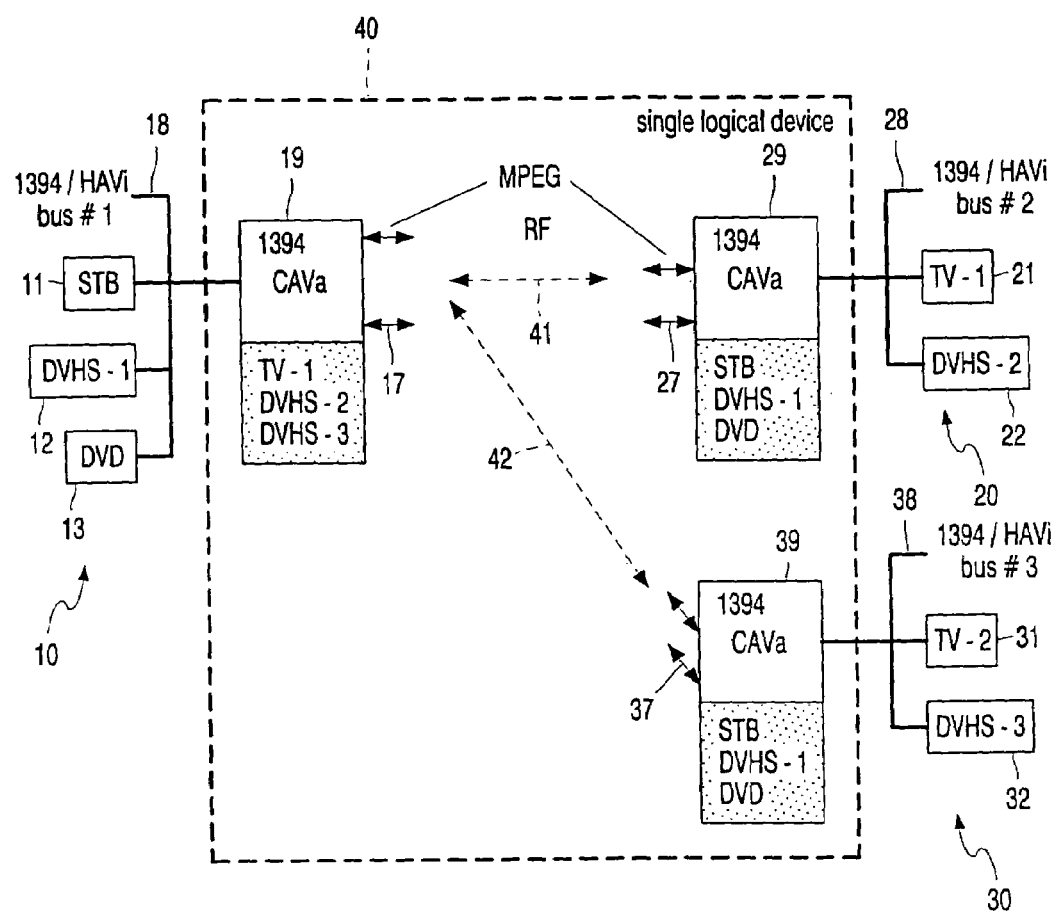
FIG. 1 represents an arrangement of devices forming three linked clusters.

A first arrangement of interconnected devices is shown in FIG. 1, with the devices being divided into three clusters 10, 20, 30, each based around a respective bus 18, 28, 38 supporting communication in accordance with IEEE Standard 1394 connect and communications protocols. In the following examples, reference is made to various communications protocols including IEEE 1394, IEEE 802.11, and HAVi (the Home Audio/Video interoperability standard based around 1394), and the disclosure of the specification of these various protocols is incorporated herein by reference. As will be recognised by the skilled reader, however, conformance with such protocols is not essential to the operation of the present invention.

The devices in the first cluster 10 comprise a set-top box (STB) 11, a first digital video recorder (DVHS-1) 12, a digital versatile disc (DVD) player 13 and an RF send and receive unit 19 which acts as a gateway device for the first cluster. The devices in the second cluster 20 comprise a first television set (TV-1) 21, a second digital video recorder (DVHS-2) 22 and an RF send and receive unit 29 which acts as a gateway device for the second cluster. The devices in the third cluster 30 comprise a second television set (TV-2) 31, a third digital video recorder (DVHS-3) 32, and an RF send and receive unit 39 which acts as a gateway device for the third cluster.

The second and third clusters 20, 30 communicate with the first 10 via respective RF links 41, 42 between the gateway devices at data rates which may be up to 8 Mbit/sec or even higher. At these rates, digital video transmitted from one cluster to another may be compressed according to the known MPEG standards. HAVi commands may also be exchanged between the clusters as indicated by arrows 17, 27, 37: note that the channel for these commands may be integrated with the RF channel or it may be separate.

In the system of FIG. 1, the main value of the cordless link is for presentation, namely getting content from a source (such as the STB 11 in the first cluster) to the point of consumption (e.g. the TV-1 in the second cluster). This is particularly relevant where the source is tethered to a delivery medium, such as cable, terrestrial/satellite antenna, phone line, etc. From a logical point of view, the gateways and RF links may be treated as a single device 40 (as indicated by the dashed outline) such that the system as a whole then comprises just 1394-linked devices, although different timing issues on either side of the bridge "device" 40 will need to be addressed, as will be described in further detail below.

A handheld PIA-like unit may be used for TV viewing although this is not necessarily of value since most rooms will have a TV anyway. PIA units have compelling value for Internet Surfing and home control, however, and they also are useful for supporting interactive TV (e.g. background information to advertisements, TV shows, etc.).

For true mobility within the home, (e.g. using a PIA-type unit) the TV picture should be stable when stationary; however, when moving some flutter is probably acceptable, and this is achievable using the high frequency RF link and MPEG compression.

In such systems, related issues include the need to protect the cordless signal from casual eavesdropping, particularly for pay-per-view content; a need to support interactive services (e.g. based on Java, MHEG); and a need to retain synchronisation between audio and video—for example, if these components are sent via separate routes.

In connection with access to the MPEG stream, some STB designs may decode right down to YC/CVBS/RGB allowing no access to the MPEG stream itself, whilst support for 1394/HAVi presumes that products are 1394/HAVi equipped which may not always be the case.

Considering the RF related issues, and beginning with those relating to MPEG streaming, for correct timing of audio and video, the MPEG 90 kHz reference clock needs to be conveyed to the receiver via the RF channel. In order to broadcast to several receivers, there is no problem if all the receivers are on the same 1394 bus (i.e. in the same cluster) but where there are several clusters, it is recommended to use a dedicated MPEG stream to each, although the gateway device for the cluster sending out the MPEG streams (the source 1394 cordless AV adapter node CAVa) has to be able to configure this streaming.

In terms of presentation issues, to protect against possible errors caused by the radio channel, duplicate MPEG streams may be sent. To protect against possible delay caused by the radio channel the content could be 'pushed' at a "faster than realtime" rate to temporary storage at the receive side. It is noted that DVD has the unique issue of high bandwidth graphic overlay which demands massive radio bandwidth for real-time transfer—this issue is beyond the scope of the present application, however.

In terms of recording or archiving, the streaming may be given a lower priority for the radio bandwidth, assuming sufficient 'spooling' storage is available on the sending side of the link (this helps with bandwidth management). To ensure a robust result, improved error protection may also be used (e.g. full acknowledged packet transfer).

Products will not generally be isolated—they will be part of a wired 1394 cluster (even if only consisting of 2 products/devices); however, the basic requirement of presentation is to communicate from one product to another, either within the same 1394 cluster, or between clusters. It is not a necessary requirement that clusters need to communicate one to another at the 1394 level.

In terms of alternative solutions to the problems of interconnection, FIG. 1 represents a cordless MPEG link approach. Assuming presentation is the major requirement; this could imply simple one directional MPEG streaming from source to sink (left to right, or right to left, in the Figure). The approach keeps the 1394 buses (clusters) entirely separate, that is to say without requiring communications over the RF link to be 1394 compliant. The receive side must have the ability to control the signal originating devices (sources) within the 1394 cluster on the send side.

The gateway (1394 CAVa) is a special HAVi Full AV controller (FAV) device. The 1394 CAVa hosts Device Control Modules (DCM's) of devices located on remote 1394 buses (if necessary, more than one bus can be linked to, for multicast purposes). This implies that, in general, all devices that are hosted will have uploadable DCM's. In FIG. 1, this is illustrated by the shaded boxes attached to each gateway device: in these shaded boxes are the "proxy" DCM's of selected products located within remote clusters. The communication of HAVi commands across the radio link can be performed in any way, including proprietary methods. AV stream routing (e.g. MPEG) may be done using 'virtual 1394 plugs' which would be coordinated with the RF addressing to direct the stream to the correct target 1394 cluster. In one variant, one or a set of standardised or common DCM's may be already present on the bridge. For example, a generic AV/C DCM could be included in the bridge to control AV/C devices, or a manufacturer could provide built-in DCM's for some of their own products.

Figure 2:
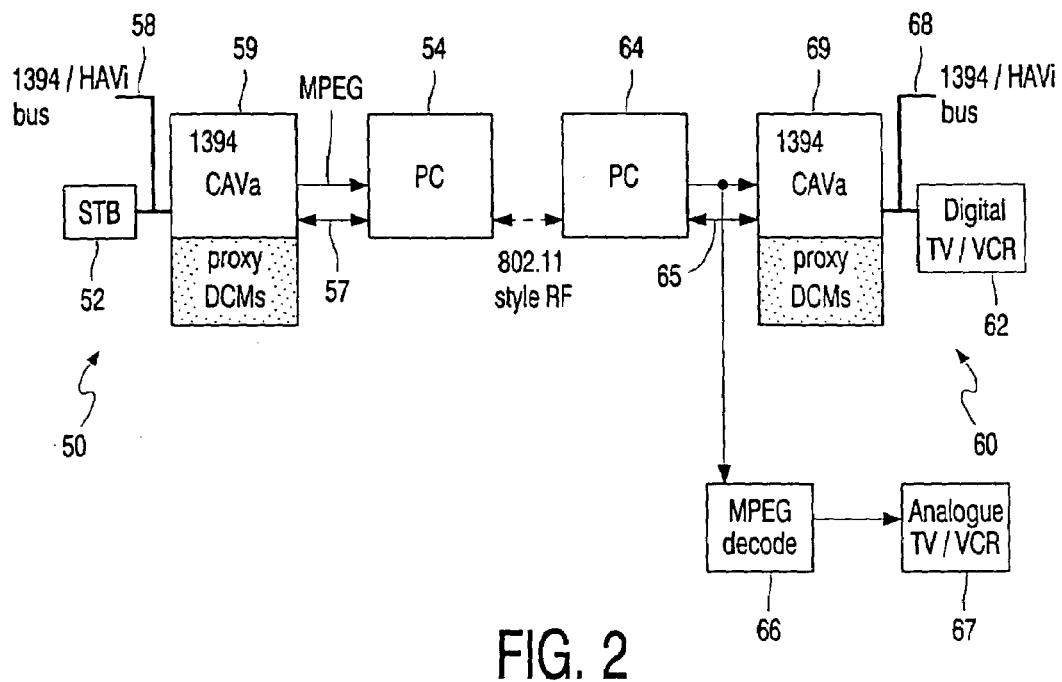
FIG. 2 shows a pair of clusters using a different interconnect mechanism to the arrangement of FIG. 1.

An alternative arrangement of interconnected clusters is shown in FIG. 2. The first cluster 50 comprises a STB 52 linked to a gateway device 59 by 1394 bus 58. Instead of RF transmission by the gateway 59, the first cluster includes a personal computer (PC) 54 or similar device which receives the MPEG from the gateway 59 as well as the HAVi commands 57 to go to a remote cluster.

The second cluster 60 comprises a digital TV/VCR unit 62 linked to a gateway device 69 via 1394 bus 68. As for the first cluster, a PC 64 is connected to the gateway 69 which receives MPEG from the PC 64, as well as the HAVi commands 65 from the first cluster 50. In this example, communication of MPEG and the HAVi commands is accomplished between the PC's 54, 64 via wireless link following IEEE 802.11 WLAN standards with each PC including an RF ISA/PCI card. Available cordless data links following these standards include Diamond HomeFree (which has a data rate of 1 Mbps) and RadioLan (10 Mbps).

In general, such an arrangement is less favoured than that of FIG. 1 in that a certain amount of buffering is liable to be required at the send and/or receive sides, although this can simply be provided by the PC's. The arrangement does have benefit, however, in that it can accommodate devices unsuited for connection to the 1394 bus of a cluster: in FIG. 2 this is illustrated by analogue TV/VCR 67 adjacent the second cluster which is supplied with images from an MPEG decoder 66 fed directly from the PC 64 of the cluster.

Figure 3:
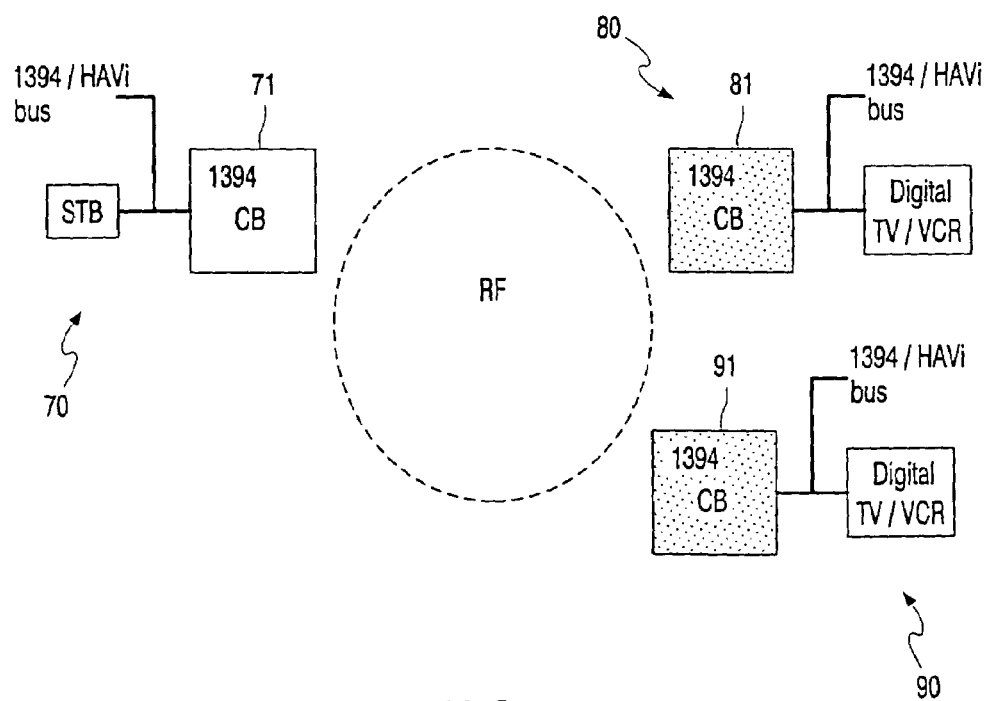
FIG. 3 shows three clusters using a still further interconnect mechanism different to the arrangements of either FIG. 1 or FIG. 2.

A further interconnect arrangement is shown in FIG. 3 and comprises three clusters 70, 80, 90 each having a respective cordless bridge CB device as gateway device 71, 81, 91. In this example, the bridging between the clusters is by full cordless communications and at data rates determined by the cordless protocols used.

A problem that can arise with sending streams over 1394 bridges is how to handle the 1394-level timestamps present in many of the streaming formats. These are required because packet delivery is time critical for some formats, including MPEG. Buses on 1394 have a bus-wide clock such that, for timestamps generated on one bus to be valid on another, the clocks of the two buses must somehow be synchronised which, the skilled reader will recognise, is not always a simple matter. In addition, timestamps within transmitted data packets may need modification or adjustment by the bridge to take account of generally longer delivery times to devices on the far side of the bridge than to devices on the data originating bus.

Figure 4:
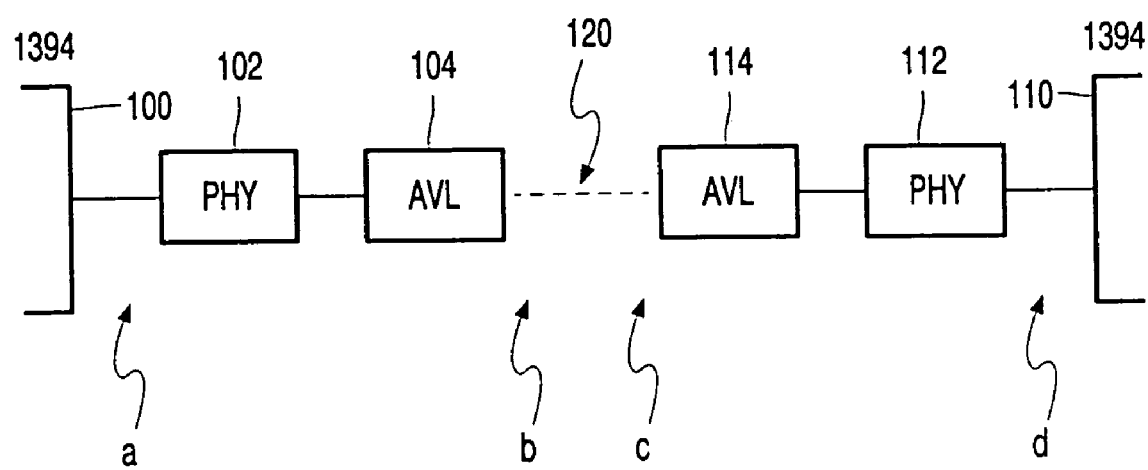
FIG. 4 schematically represents an arrangement for the handling of timing issues over the bridge in any of FIGS. 1 to 3.

In order to avoid such problems, a system as shown in FIG. 4 is suitably employed, with the 1394 buses 100, 110 on either side of the bridge 120. At point a, packets from the 1394 bus 100 are encoded and timestamped as specified in a further standard, IEC61883.

At point b, all the packets have passed through an interface chip or circuit assembly PHY 102 acting as interface to the 1394 physical layer, and through a link chip or circuit AVLINK 104 which implements IEC61883 for the relevant streaming format: an example of this chip is the Philips PDI1394L11. At b, the packets have had all 1394/61883 timestamps removed. Packets are released from the AVLINK chip 104 at the correct times, such that the timing information is now embodied by the release times of the packets themselves. In the following, we assume a packet is released at time t.

The next step is the sending of the packet across the bridge 120: the only requirement of the bridge system is that it delivers the packet with a constant delay, referred to herein as T. How the bridge achieves this constancy is beyond the scope of the present invention: what matters is that a packet can be relied upon to arrive at a further AVLINK chip 114 on the other side of the bridge at time=t+T.

At point c, packets arrive at the "correct" time due to the constant delay T, and the AVLINK chip will now encode and timestamp them in conventional fashion, as dictated by IEC61883. These timestamps will be in the context of the second bus 110. If it is determined that packets have been lost or corrupted by the bridge 120, it is here at c, between the bridge and AVLINK 114 that recovery actions should be initiated.

From point d, having been passed through a further physical layer PHY interface 112, the packets are sent out over the second bus 110 with timestamps appropriate for that bus.

To send digital video (DV) streams, there are some different requirements, largely due to the fact that DV is slightly less time-critical on delivery than MPEG, and a slightly different mechanism is used, based around the SYT timestamp as also specified in IEC61883. This allows for a stream to be sent with an "attached" clock signal, which can be up to 8 kHz. To send this, a clock signal with a frequency≦8 kHz is input to the AVLINK chip on the transmitting node. Every clock cycle (every "tick"), the value of the bus clock at that instant will be sampled, a constant value will be added to compensate for the transport delay, and transmitted over the bridge as part of the stream. The receiving node will store the value until such time as its own clock is equal to that value, and then output a tick. The 8 kHz limit is imposed as only one SYT timestamp can be sent per 1394 isochronous packet, of which there are 8000 per second.

As before, the physical means of transportation for this clock signal across the bridge will depend on the construction of the bridge itself. The same principle of taking the output from the receiving AVLINK chip on the first bus will mean that no timestamps in the context of the first bus appear on the second bus; the clock signal is just sent over the bridge to be re-timestamped to the context of the second bus.

In the interconnect arrangements described, a number of improvements are provided, the first of which may be described as the provision of mobile DCM's—that is to say DCM's crossing from one cluster to another. HAVi describes the Device Control Module (DCM) software which represents (or is an abstraction of) the control system of a physical device. This software can be run on another device that is capable of running such software. For instance, the DCM for a D-VHS recorder can be run on a Set Top Box. Currently, HAVi assumes that all devices in the network are connected on one single bus. The present invention extends this by providing for the DCM's to cross over the bridge. By having a representation of the remote device on the near side of the bridge, bridging problems can be greatly simplified as the remote device is apparently now on the near side of the bridge. In other words, there is provided software on one side of a bridge between buses which represents a device on another bus which is connected to another portal of the bridge.

A further improvement relates to the usage of so-called Legacy devices within the HAVi V1.0 specification. Legacy AV devices (LAV's) are already defined in HAVi and allow non-HAVi devices to be accessed and controlled by a HAVi network, by the use of DCM's (mentioned above). In effect, the DCM for a Legacy device is a bridge between a HAVi network and the native control of the Legacy Device (e.g. the above-mentioned D2B protocols). In this way, non-HAVi devices can be made to appear like a HAVi device on the HAVi network. This idea extends this mechanism to allow control of real HAVi devices on the far side of a bridge via the representation of that device on the near side of the bridge.

A still further improvement relates to the modification of Virtual plug parameters. HAVi already describes the capabilities of a connection by assigning, parameters to "virtual plugs" situated at each end of the connection path. In a bridge, parameters such as bandwidth are limited and are less than the capabilities of the actual physical device. The modification allows the representation of a remote device on the near side of the bridge to be modified to make allowances for the limitations of the bridge transport medium (e.g. RF).

From reading the present disclosure, other modifications and variations will be apparent to persons skilled in the art, including equivalents and features which are already known in the field of bus-connected and cordless communication systems and components and which may be used instead of or in addition to features already disclosed herein.

What is claimed is:

1. A local communication system comprising:
   a first cluster of devices interconnected for the communication of messages via a first data bus and in accordance with a first set of communication protocols;
   a second cluster of devices interconnected for the communication of messages via a second data bus and in accordance with said first set of communication protocols; and
   a data channel linking said first cluster and said second cluster, said data channel supporting communication of messages in accordance with a second set of communications protocols;
   wherein a device of the first cluster holds a stored software representation of operational features of a selected device of the second cluster and any device of the first cluster wishing to interact with said selected device instead interacts with said stored representation, and
   wherein said stored representation is modified in response to limitations of said data channel.

2. A local communication system comprising:
   a first cluster of devices interconnected for the communication of messages via a first data bus and in accordance with a first set of communication protocols;
   a second cluster of devices interconnected for the communication of messages via a second data bus and in accordance with said first set of communication protocols; and
   a data channel linking said first cluster and said second cluster, said data channel supporting communication of messages in accordance with a second set of communications protocols,
   wherein a device of the first cluster holds a stored software representation of operational features of a selected device of the second cluster and any device of the first cluster wishing to interact with said selected device instead interacts with said stored representation,
   wherein said stored representation is generated by said selected device and transmitted via said data channel to said device of the first cluster, and
   wherein said stored representation is modified, on receipt by said device of the first cluster, in response to limitations of said data channel.

3. A communication system comprising:
   a first cluster of devices interconnected via a first data bus and adapted to communicate in accordance with a first set of communication protocols;
   a second cluster of devices interconnected via a second data bus and adapted to communicate in accordance with said first set of communication protocols; and
   a data channel linking said first data bus and said second data bus, said data channel adapted to support communication of messages between the first and second clusters in accordance with a second set of communications protocols,
   wherein a first device of the first cluster stores a software representation of operational features of a selected device of the second cluster, permitting a second device of the first cluster to control the selected device by executing the software representation,
   wherein said stored software representation is modified, on receipt by said first device of the first cluster, in response to limitations of said data channel.

* * * * *